United States Patent [19]

Goldenberg

[11] Patent Number: 4,952,139

[45] Date of Patent: Aug. 28, 1990

[54] GAS FEED DEVICE COMPRISING TUBES WITH NARROWED ZONES

[75] Inventor: Emmanuel Goldenberg, Poissy, France

[73] Assignee: Institut Francais du Petrole, Rueil Malmaison, France

[21] Appl. No.: 463,016

[22] Filed: Jan. 9, 1990

Related U.S. Application Data

[63] Continuation of Ser. No. 137,106, Dec. 23, 1987, abandoned.

[30] Foreign Application Priority Data

Dec. 23, 1987 [FR] France ............................. 86 18032

[51] Int. Cl.$^5$ ............................................. F23D 15/02
[52] U.S. Cl. ................................ 431/353; 239/424.5; 431/181
[58] Field of Search ........................... 431/353, 181; 239/132.3, 422, 424, 424.5, 160, 434.5

[56] References Cited

U.S. PATENT DOCUMENTS 3,856,457 12/1974 Miller ................................ 431/353

*Primary Examiner*—Carl D. Price
*Attorney, Agent, or Firm*—Antonelli, Terry, Stout & Kraus

[57] ABSTRACT

A device is provided for conveying separately at least two gases as far as a mixing zone, said device including several tubes, and means for supplying these tubes with one of the gases, the invention also relating to a reactor having at least one cell equipped with said conveying device, said device further including means for holding the tubes in position with respect to each other, the tubes being held together jointly by said means and defining empty spaces or intertube gaps, some at least of said tubes having narrowed zones placed substantially at the same level so as to form a network for distributing the other gas to some at least of the intertube gaps.

11 Claims, 1 Drawing Sheet

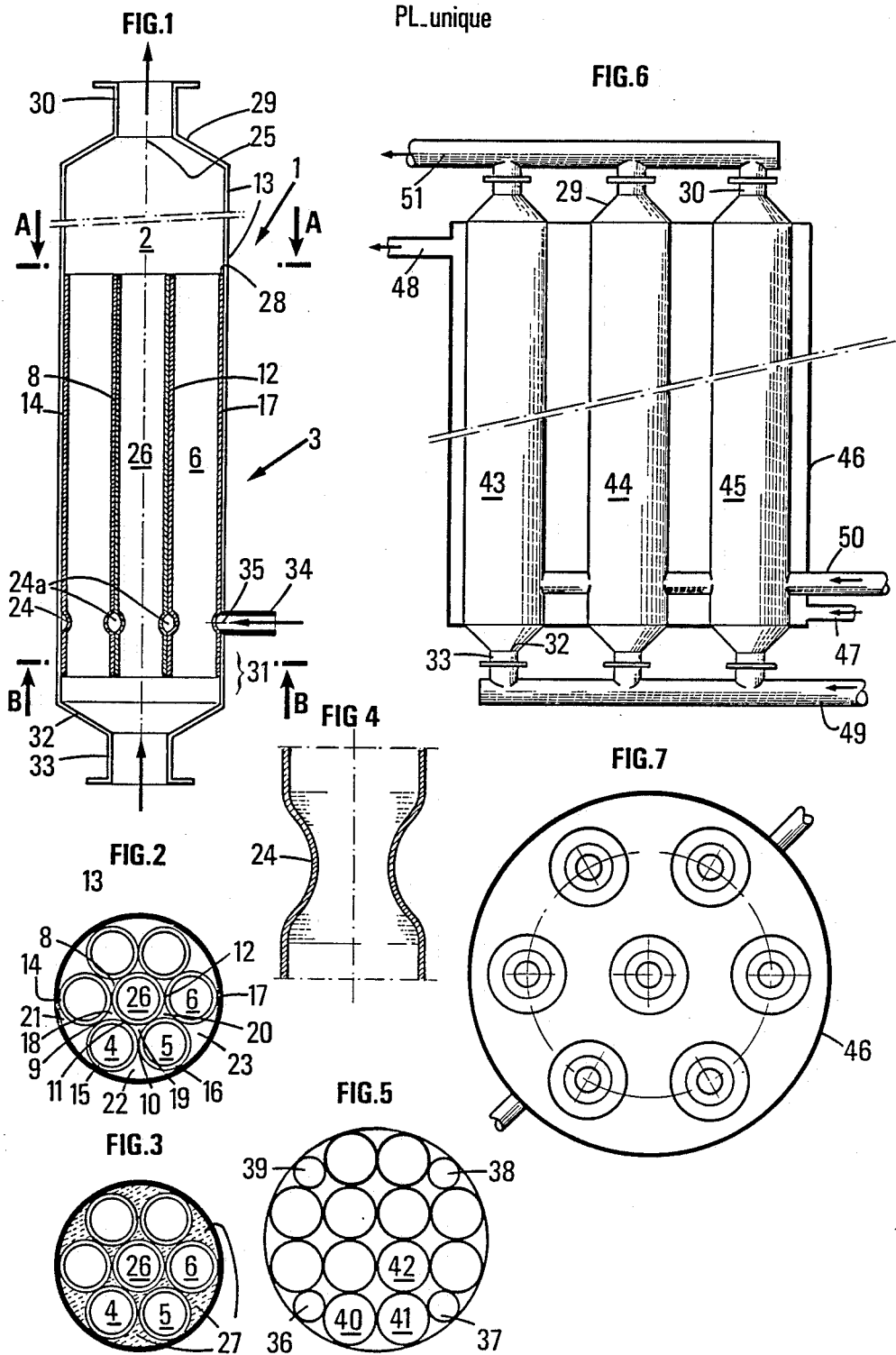

GAS FEED DEVICE COMPRISING TUBES WITH NARROWED ZONES

This application is a continuation of application Ser. No. 137,106, filed Dec. 23, 1987, now abandoned.

BACKGROUND OF THE INVENTION

The present invention relates to a device for feeding gas into a mixing zone, such as a reactor.

The present invention also relates to a reactor using this gas feed device.

The device of the invention makes it possible to feed two gases, the mixture of which may be explosive, into a reactor so as to cause them to react.

The device of the invention is of particularly simple construction.

In the case of an application to a reactor, the device of the invention makes it possible to convey two gases through two separate circuits as far as a zone where they react together through a diffusion process.

The present invention is particularly applicable to the method of producing synthetic gas, for example for obtaining the controlled oxidization of methane.

SUMMARY OF THE INVENTION

The device of the invention makes it possible to introduce two gases into a reactor without there being previous mixing of these two gases, while controlling the speeds of feeding the gases into the reactor. For example, the device of the invention makes it possible to obtain established flows and to have flow speeds substantially uniform in direction and/or in speed for each of the gases before they are fed into the mixing zone and thus to control the reaction.

The device of the invention includes several small cylindrical tubes assembled together jointingly by means of an external casing.

In accordance with the present invention, one of the gases used in the reaction flows inside the small tubes, the other gas flows in the interstitial spaces defined by the external walls of the different small tubes.

At one of the ends of the stack formed by the assembly of small tubes, the different interstitial spaces are plugged over a certain height, thus isolating the two circuits defined respectively by the inside of the different small tubes and by the interstitial spaces.

Thus the gas brought to this end will travel inside the small tubes and leave at the other end of the stack, at which level the reaction or mixture is to take place.

So as to make it possible to feed the other gas into the different interstitial spaces, the small tubes have, at the same level, a narrowed zone. Thus a network of channels is created for feeding the different interstitial spaces with gas.

The gas may be fed to this network through a fixed duct or a duct forming part of the external casing and opening at the level of the narrowed zones of the small tubes.

It is possible in accordance with the present invention to use several elements or cells for the same reactor. By cell or element is meant an assembly including a gas feed device and the mixing zone for these gases.

It is also possible in accordance with the present invention to cool or to heat the gases flowing through an element, by creating a flow of heat carrying fluid about the external cylinder or cylinders.

Thus, the present invention relates to a device for conveying or feeding separately at least two gases into a diffusion and possibly reaction mixing zone. This device includes several tubes, and means for feeding these tubes with one of the gases. It further includes means for holding these tubes in position with respect to each other. These means hold the tubes together jointingly. The tubes define therebetween empty spaces or intertube gaps.

Some at least of said tubes have narrowed zones placed substantially at the same level of the tubes so as to form a network for distributing another gas to some at least of the intertube gaps.

The tubes may have substantially the shape of cylinders of revolution.

The holding means may comprise a casing in which the tubes may be placed. This casing may include a orifice for feeding the other gas at the level of the narrowed zones.

The casing may be extended beyond the outlet end of the tubes and thus define the mixing or reaction zone. The whole of the feed device and of the mixing zone forms a cell.

The casing may be extended beyond the ends of the tubes opposite their outlet ends.

The intertube spaces may include means for isolating these spaces with respect to the chamber formed by the extension of said casing.

This chamber may include a gas feed orifice. This chamber may serve as chamber for supplying the tubes.

The present invention also relates to a reactor making it possible to obtain a reaction between two gases comprising at least one cell.

This cell may be placed in a sealed enclosure containing a heat carrying fluid.

The reactor may comprise several cells. It may also in this case comprise a sealed enclosure containing a heat carrying fluid.

The enclosure may have at least one inlet orifice and at least one outlet orifice for the heat carrying fluid so as to ensure flow thereof.

The cell may further have an orifice for feeding a third fluid substantially in the mixing zone such as vapor or reactive products.

Of course, the device of the invention may be used as a burner.

Without departing from the scope of the present invention, the walls of the cell may have a refractory material on at least the zones the most exposed to high temperatures, these walls being for example lined with a ceramic material.

BRIEF DESCRIPTION OF THE DRAWINGS

The present invention will be better understood and its advantages will be clear from the following description of particular embodiments, which are in no wise limitative, illustrated by the accompanying Figs. in which:

FIG. 1 shows a cell equipped with the feed device of the invention,

FIGS. 2 and 3 show two sectional views of FIG. 1, respectively through AA and BB, FIG. 4 illustrates a detail of the feed tube of the device of the invention, FIG. 5 shows one embodiment with feed tubes of different diameters, FIG. 6 shows a reactor with several enclosures, and FIG. 7 shows a sectional view of the reactor of FIG. 6.

A MORE DETAILED DESCRIPTION OF THE INVENTION

The particular example described relates to a device for feeding two gases which are to react with each other and whose mixture may be explosive.

The present example also relates to a cell equipped with this gas feed device.

The present invention may be applied to obtaining synthetic gas from a fuel such as hydrocarbons and a combustive agent such as oxygen.

Thus, the two gases may be methane or natural gas and oxygen.

In FIG. 1, reference 1 designates the cell as a whole. It includes a mixing or reaction zone 2 and the gas feed device 3. Reference 25 designates the axis of the cell.

The gas feed device 3 includes several substantially cylindrical tubes 4, 5, 6 and 7.

These tubes may be assembled jointingly together along generatrices 8, 9, 10, 11, 12.

These tubes may be held together in an external casing 13 which is itself jointingly in contact with the external tubes along generatrices 14, 15, 16, 17.

These tubes, which are cylinders of revolution, define therebetween free intertube spaces 18, 19, 20.

These intertube spaces are defined on the external row of tubes 4, 5, 6 by means of the internal wall of the external casing 13. The intertube spaces thus defined bear the references 21, 22, 23.

Some of the tubes have at their lower part a zone of reduced cross section or narrowed zone 24 (see FIGS. 1 and 4).

These narrowed zones or portions are situated substantially at the same level so as to form a network of ducts 24a for supplying the intertube spaces.

It is certain that all the tubes do not necessarily need to have a narrowed portion 24. Thus, in the case of FIGS. 1, 2 and 3, the central tube 26 has no need of a narrowed portion since it is the narrowed portions of the tubes which surround it which will serve for supplying the intertube spaces which are contiguous with the central tube.

At the lower end of the tubes, considered relatively to the direction of FIG. 1, the intertube spaces 18, 19, 20, 21, 22 and 23 are plugged, for example, by means of a sealing cement 27 or by one or more plates or walls possibly welded or iron banded etc. This makes it possible particularly to hold the tubes in position by fixing these plates or walls to the external casing 21. Thus, the gas which feeds the network formed by the narrowed zones, is fed to the intertube spaces through the mixing or reaction zone 2.

The narrowed zone 24 may be in the shape of a torus or have any other shape as long as it makes possible feeding of the intertube spaces which it is desired to supply.

In FIG. 1, the external casing 13 is extended beyond end 28 through which the gases leave so as to define the reaction zone 2. This casing 13 ends in a roof 29 having an effluent discharge orifice 30.

At the lower part of FIG. 1, casing 13 is also extended beyond the end 31 of the tubes, so as to form a chamber 32 for supplying the tubes with one of the gases.

This chamber has a gas supply orifice 33.

Of course, this chamber supplies the tubes and not the intertube spaces, because of the plugging means (cement or plates or walls) 27 closing the intertube spaces.

The intertube spaces are supplied with gas through a duct 34 which opens at an orifice 35 formed in the external casing 13 at the level of the narrowed zones 24.

The external casing 13 may in addition have a groove at the level of the narrowed zones 24 so as to improve the supply to the different narrowed zones 24 and so to network 24a.

Of course, the diameter of the tubes may be different from one tube to another.

FIG. 5 illustrates such an embodiment. In this Fig., tubes 36, 37, 38 and 39 have a smaller diameter than that of the other tubes, for example 40, 41, 42.

The number and/or form of the tubes make it possible to control the gas feed speeds and so the mixing rates thereof.

The operation of the device of the invention is self explanatory. The gases coming from chamber 33 supply the inside of the tube and leave therefrom into the mixing zone 2.

The gases arriving through duct 34 are divided by the network 24a formed of the different narrowed zones 24 so as to supply the intertube spaces and leave to pass into the mixing zone 2.

The lengths of the tubes and of the intertube spaces make it possible to obtain established flows so that the structure of the gases emerging in the mixing zone 2 is regular.

FIGS. 6 and 7 illustrate a reactor having several cells 43, 44, 45.

These cells, 7 in number (FIG. 7), are placed in a sealed enclosure 46. Preferably, these cells are not jointing with the walls of this enclosure.

This enclosure may be filled with a heat carrying fluid so as to exchange heat with the cells 43, 44, 45. This fluid may bring heat to or take heat from the reactor depending on the needs.

Ducts 47 and 48 connected to enclosure 46 make possible the flow of the heat carrying fluid.

Ducts 49 make it possible to supply chambers 32 with gas which supply the tubes of the different cells 3, whereas ducts 50 make it possible to supply with gas the network feeding the intertube spaces of the different cells.

Ducts 51 collect the effluents from the different cells.

The multicell type of reactor may be applied to obtaining synthetic gas from a combustive gas, such as oxygen, and a fuel gas such as hydrocarbon gases.

What is claimed is:

1. A device for conveying separately at least two gases to a mixing zone, said device including several tubes, means for supplying said tubes with one of the gases and further including means for holding said tubes in position with respect to each other, said means holding the tubes together jointingly to cause an exterior wall of each of said tubes to have a line contact along a length of an exterior wall of another tube and define empty intertube gaps therebetween, at least some of said tubes having narrowed zones each being placed substantially at the same level so as to form a network of passages outside of the tubes for distributing the other gas to at least some of the intertube gaps.

2. The device as claimed in claim 1, wherein said tubes have the shape of cylinders of revolution.

3. The device as claimed in one of claims 1 or 2, wherein said holding means comprise a casing in which said tubes are placed and said casing has an orifice for feeding the other gas at the level of said narrowed zones.

4. The device as claimed in claim 3, wherein said casing is extended beyond outlet ends of the tubes thus defining the mixing zone, the assembly of said device and said mixing zone forming a cell.

5. The device as claimed in claim 3, wherein said casing is extended beyond the ends of said tubes opposite the outlet ends, and the intertube gaps include means for isolating said gaps with respect to the chamber formed by the extension of said casing, said chamber having a gas feed orifice and serving as chamber for supplying said tubes.

6. A reactor for carrying out a reaction between two gases including at least one cell as claimed in claim 4.

7. The reactor as claimed in claim 6, wherein said cell is placed in a sealed enclosure containing a heat carrying fluid.

8. The reactor as claimed in claims 7, wherein said enclosure has at least one inlet orifice and at least one outlet orifice for said heat carrying fluid so as to ensure flow thereof.

9. The reactor as claimed in claim 6, comprising several cells.

10. The reactor as claimed in claim 9, comprising a sealed enclosure containing a heat carrying fluid.

11. A device for conveying separately at least two gases to a mixing zone, said device including several tubes, means for supplying said tubes with one of the gases and further including means for holding said tubes in position with respect to each other, said means holding the tubes together jointly to cause an exterior wall of each of said tubes to have a line contact along a length of an exterior wall of another tube and define empty intertube gaps therebetween, at least some of said tubes having narrowed zones which each have the shape of a torus, said zones each being placed substantially at the same level so as to form a network of passages outside of the tubes for distributing the other gas to at least some of the intertube gaps.

* * * * *